United States Patent
Bernadet et al.

(10) Patent No.: US 11,077,427 B2
(45) Date of Patent: Aug. 3, 2021

(54) POROUS MONOLITH CONTAINING TIO$_2$ AND METHOD FOR THE PRODUCTION THEREOF

(71) Applicant: IFP Energies Nouvelles, Rueil-Malmaison (FR)

(72) Inventors: Sophie Bernadet, Merignac (FR); Antoine Fecant, Brignais (FR); Denis Uzio, Oullins (FR); Renal-Vasco Backov, Bordeaux (FR); Serge Ravaine, Cestas (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 110 days.

(21) Appl. No.: 16/608,312

(22) PCT Filed: Apr. 23, 2018

(86) PCT No.: PCT/EP2018/060376
§ 371 (c)(1),
(2) Date: Oct. 25, 2019

(87) PCT Pub. No.: WO2018/197432
PCT Pub. Date: Nov. 1, 2018

(65) Prior Publication Data
US 2021/0101133 A1 Apr. 8, 2021

(30) Foreign Application Priority Data
Apr. 28, 2017 (FR) ...................................... 1753757

(51) Int. Cl.
| | | |
|---|---|---|
| *B01J 21/08* | (2006.01) | |
| *B01J 21/06* | (2006.01) | |
| *B01J 35/00* | (2006.01) | |
| *B01J 35/04* | (2006.01) | |
| *B01J 35/10* | (2006.01) | |
| *B01J 37/02* | (2006.01) | |
| *B01J 37/03* | (2006.01) | |
| *B01J 37/04* | (2006.01) | |
| *B01J 37/08* | (2006.01) | |

(52) U.S. Cl.
CPC ............. *B01J 21/08* (2013.01); *B01J 21/063* (2013.01); *B01J 35/004* (2013.01); *B01J 35/0026* (2013.01); *B01J 35/04* (2013.01); *B01J 35/109* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1057* (2013.01); *B01J 35/1061* (2013.01); *B01J 35/1071* (2013.01); *B01J 35/1076* (2013.01); *B01J 37/0201* (2013.01); *B01J 37/0236* (2013.01); *B01J 37/036* (2013.01); *B01J 37/04* (2013.01); *B01J 37/088* (2013.01)

(58) Field of Classification Search
CPC ...... B01J 21/063; B01J 21/08; B01J 35/0026; B01J 35/004; B01J 35/04; B01J 35/1019; B01J 35/1023; B01J 35/1038; B01J 35/1042; B01J 35/1047; B01J 35/1057; B01J 35/1061; B01J 35/1071; B01J 35/1076; B01J 35/109; B01J 37/0201; B01J 37/0236; B01J 37/036; B01J 37/04; B01J 37/088
See application file for complete search history.

(56) References Cited

U.S. PATENT DOCUMENTS

| | | | |
|---|---|---|---|
| 5,322,821 A | 6/1994 | Brezny | |
| 5,384,290 A | 1/1995 | Brezny | |
| 8,865,618 B2 | 10/2014 | Backov et al. | |
| 8,865,619 B2 | 10/2014 | Backov et al. | |
| 2011/0262993 A1 | 10/2011 | Backov et al. | |
| 2012/0082615 A1 | 4/2012 | Backov et al. | |
| 2016/0225963 A1* | 8/2016 | Yoshimura | ............ H01L 33/504 |
| 2016/0236177 A1 | 8/2016 | Backov et al. | |

FOREIGN PATENT DOCUMENTS

| | | |
|---|---|---|
| JP | 2009-7219 A | 1/2009 |
| WO | 2010/049649 A2 | 5/2010 |

OTHER PUBLICATIONS

International Search Report dated Jun. 19, 2018 issued in corresponding PCT/EP2018/060376 application (3 pages).
English Abstract of JP 2009-007219 A published Jan. 15, 2009.

* cited by examiner

*Primary Examiner* — Brian A McCaig
(74) *Attorney, Agent, or Firm* — Millen White Zelano and Branigan, PC; Csaba Henter

(57) ABSTRACT

The invention relates to a porous monolith comprising between 20 wt.-% and 70 wt.-% TiO 2 relative to the total weight of the monolith, and between 30 wt.-% and 80 wt.-% a refractory oxide, selected from silica, alumina or silica-alumina, relative to the total weight of the monolith, characterized in that said porous monolith has a bulk density of less than 0.19 g/mL.

16 Claims, No Drawings

POROUS MONOLITH CONTAINING TIO$_2$ AND METHOD FOR THE PRODUCTION THEREOF

TECHNICAL FIELD

The field of the invention is that of materials with a hierarchical structure. More particularly, the present invention relates to a porous monolith containing TiO$_2$ and to the process for the preparation thereof.

PRIOR ART

It is known practice to prepare monoliths based on inorganic oxides, in particular on silica, having multiple porosities, the macroporosity being obtained by means of a process of forming by direct emulsion.

A. Araya et al. (U.S. Pat. No. 4,888,309) and A. Imhof et al. (Nature, vol. 389, Oct. 30, 1997, pp. 948-952) describe the implementation of sol-gel processes using alkoxides dissolved in an alcohol and hydrolyzed by addition of a small amount of water, it being recalled that most alkoxides are highly reactive with water and do not give stable emulsions. This document also describes the preparation of monodisperse microporous materials of titanium oxide, of zirconia or of silica with pore diameters between 50 nm and several micrometers, from a monodisperse emulsion of oil in formamide.

B. P. Binks (Adv. Mater., 2002, 14, No. 24, pp. 1824-1827, December 17) describes the preparation of porous silica from an emulsion stabilized with particles of silica only, in the absence of surfactant.

J. S. Beck et al. (J. Am. Chem. Soc., 1992, 114, 10834-10843) describe the preparation of mesoporous solids constituted by a silicate or an aluminosilicate.

A patent application WO 2015/110772 describes the use of an N—TiO$_2$-based material in the form of a porous monolith as a photocatalyst for the degradation of pollutants in the air or in water under radiation in the visible spectrum or for the cracking of water to H$_2$ under radiation in the visible spectrum.

Another patent filing, FR 2975309, describes a mode of preparation of a porous monolith containing TiO$_2$ and the use thereof as a photocatalyst for the degradation of pollutants in the air or in water under irradiation. The monoliths claimed have bulk densities of about 1 g/ml.

It is also known, from M. Tahir and N. S. Amin (Appl. Catal. A: General 467 (2013), 483-496, and Chem. Eng. J., 230 (2013), 314-327), to use a monolith of "honeycomb" type containing channels of millimetric size coated with a semiconductor compound. This type of object also has a high density per unit volume (of about from 0.8 to 0.9 g/ml).

However, none of the prior art documents describes material of porous monolith type containing at least 20% by weight of TiO$_2$ and having a bulk density of less than 0.19 g/ml. According to the subject of the invention, the combination of a high TiO$_2$ content and a low bulk density makes it possible to have monoliths with increased exposed TiO$_2$ surfaces compared with the prior art. These properties allow the monolith according to the invention to be advantageously used in catalytic or photocatalytic applications.

More particularly, the invention describes a porous monolith containing from 20% to 70% by weight of TiO$_2$ relative to the total weight of the monolith, from 30% to 80% by weight of a refractory oxide selected from silica, alumina or silica-alumina relative to the total weight of the monolith, and having a bulk density of less than 0.19 g/ml. The bulk density is calculated by taking the ratio of the weight of the porous monolith to the geometric volume thereof.

According to one variant, said porous monolith has a mesoporous volume of from 0.01 to 1 ml/g for a pore diameter between 0.2 and 50 nm, preferably between 0.05 and 0.5 ml/g.

According to one variant, said porous monolith has a type-I macroporous volume, i.e. of which the pore diameter is greater than 50 nm and less than or equal to 1000 nm, of between 0.1 and 3 ml/g, preferably between 0.2 and 2.5 ml/g.

According to one variant, said porous monolith has a type-II macroporous volume, i.e. of which the pore diameter is greater than 1 µm and less than or equal to 10 µm, of between 0.1 and 8 ml/g, preferably between 0.5 and 8 ml/g.

According to one preferred variant, said photocatalyst in the form of a porous monolith has a mesoporosity and/or a type-I macroporosity and/or a type-II macroporosity as described above.

According to one variant, said porous monolith also has a macroporous volume of less than 0.5 ml/g for a pore diameter of greater than 10 µm.

The macroporous and mesoporous volumes are measured by mercury intrusion porosimetry according to standard ASTM D4284-83 at a maximum pressure of 4000 bar (400 MPa), using a surface tension of 484 dynes/cm and a contact angle of 140°.

According to one variant, said photocatalyst in the form of a porous monolith has a specific surface area (measured according to standard ASTM D 3663-78 established from the Brunauer, Emmett, Teller method, i.e. BET method, as defined in S. Brunauer, P. H. Emmett, E. Teller, J. Am. Chem. Soc., 1938, 60 (2), pp. 309-319) of between 150 and 700 m$^2$/g, preferably between 200 and 600 m$^2$/g.

Preferably, the TiO$_2$ is in its anatase and rutile forms, the anatase:rutile ratio preferably being between 95:5 and 50:50.

The invention also relates to a process for preparing said porous monolith, wherein the Ti precursor is introduced in a step other than that of the silicon and/or aluminum oxide precursor. The process comprises the following steps:

a) a solution containing a surfactant is mixed with an acidic aqueous solution so as to obtain an acidic aqueous solution comprising a surfactant;

b) at least one silicon and/or aluminum precursor is added to the solution obtained in step a);

c) at least one liquid organic compound that is immiscible with the solution obtained in step b) is added to the solution obtained in step b) so as to form an emulsion;

d) the emulsion obtained in step c) is left to mature in the wet state so as to obtain a gel;

e) the gel obtained in step d) is washed with an organic solution;

f) the gel obtained in step e) is dried and calcined so as to obtain a porous monolith;

g) a solution comprising at least one soluble titanium precursor is impregnated in the porosity of the porous monolith obtained in step f);

h) optionally, the porous monolith obtained in step g) is left to mature in the wet state;

i) the porous monolith obtained in step g) or h) is dried and calcined so as to obtain a porous monolith containing TiO$_2$.

DETAILED DESCRIPTION OF THE INVENTION

Definitions

In the subsequent text, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of columns 8, 9 and 10 according to the new IUPAC classification.

In the present description, according to the IUPAC convention, the term "micropores" is intended to mean pores of which the diameter is less than 2 nm; the term "mesopores" is intended to means pores of which the diameter is greater than 2 nm and less than or equal to nm and the term "macropores" is intended to mean pores of which the diameter is greater than 50 nm, and more particularly the term "type-I macropores" is intended to means pores of which the diameter is greater than 50 nm and less than or equal to 1000 nm (1 μm), and the term "type-II macropores" is intended to means pores of which the diameter is greater than 1 μm and less than or equal to 10 μm.

Description

According to the invention, the porous monolith comprises between 20% and 70% by weight of $TiO_2$ relative to the total weight of the monolith, preferably between 20% and 60% by weight of $TiO_2$. The porous monolith according to the invention also comprises between 30% and 80% by weight of a refractory oxide selected from silica, alumina or silica-alumina, relative to the total weight of the monolith, preferably between 40% and 80% by weight.

The porous monolith according to the invention has a bulk density of less than 0.19 g/ml, preferably less than 0.16 g/ml. The bulk density is calculated by the ratio of the weight of the porous monolith to its geometric volume.

Advantageously, said porous monolith may contain at least one element M selected from an element of groups IA, IIA, VIIIB, IB and IIIA of the periodic table of the elements in the metal or oxidized state, alone or as a mixture. Preferably, the total content of element(s) M is between 0.001% and 20% by weight relative to the total weight of the porous monolith.

Advantageously, the porous monolith may be doped with one or more elements selected from metal elements, such as for example elements V, Ni, Cr, Mo, Fe, Sn, Mn, Co, Re, Nb, Sb, La, Ce, Ta or Ti, non-metal elements, such as for example C, N, S, F or P, or with a mixture of metal and non-metal elements. The content of doping element is between 0.001% and 5% by weight relative to the total weight of the porous monolith.

According to one variant, said porous monolith has a mesoporous volume of from 0.01 to 1 ml/g, preferably between 0.05 and 0.5 ml/g, for a pore diameter of between 0.2 and 50 nm.

According to one variant, said porous monolith has a type-I macroporous volume, i.e. of which the pore diameter is greater than 50 nm and less than or equal to 1000 nm (1 μm), of between 0.1 and 3 ml/g, preferably between 0.2 and 2.5 ml/g.

According to one variant, said porous monolith has a type-II macroporous volume, i.e. of which the pore diameter is greater than 1 μm and less than or equal to 10 μm, of between 0.1 and 8 ml/g, preferably between 0.5 and 8 ml/g.

According to one preferred variant, said porous monolith has a mesoporosity and/or a type-I macroporosity and/or a type-II macroporosity.

According to one variant, said porous monolith also has a macroporous volume of less than 0.5 ml/g for a pore diameter of greater than 10 μm.

According to one variant, said porous monolith has a BET surface area of between 150 and 700 m$^2$/g.

The invention also describes the method for preparing said porous monolith, such that the Ti precursor is introduced in a step other than that of the silicon and/or aluminum oxide precursor;

a) a solution containing a surfactant is mixed with an acidic aqueous solution so as to obtain an acidic aqueous solution comprising a surfactant;

b) at least one silicon and/or aluminum precursor is added to the solution obtained in step a);

c) at least one liquid organic compound that is immiscible with the solution obtained in step b) is added to the solution obtained in step b) so as to form an emulsion;

d) the emulsion obtained in step c) is left to mature in the wet state so as to obtain a gel;

e) the gel obtained in step d) is washed with an organic solution;

f) the gel obtained in step e) is dried and calcined so as to obtain a porous monolith;

g) a solution comprising at least one soluble titanium precursor is impregnated in the porosity of the porous monolith obtained in step f);

h) optionally, the porous monolith obtained in step g) is left to mature in the wet state;

i) the porous monolith obtained in step g) or h) is dried and calcined so as to obtain a porous monolith containing $TiO_2$.

The steps are described in detail hereinafter.

Step a) (Preparation of an Acidic Aqueous Solution Comprising a Surfactant)

During step a) of the process according to the invention, a solution containing a surfactant is mixed with an acidic aqueous solution so as to obtain an acidic aqueous solution comprising a surfactant. This step is preferably carried out at ambient temperature.

The surfactant may be anionic, cationic, amphoteric or nonionic. Preferably, the surfactant is a cationic surfactant. Very preferably, the surfactant is cetyltrimethylammonium bromide or myristyltrimethylammonium bromide. The acidic aqueous solution is preferably selected from inorganic acidic aqueous solutions such as nitric acid, sulfuric acid, phosphoric acid, hydrochloric acid or hydrobromic acid, or organic acids such as carboxylic or sulfonic acids, alone or as a mixture. Preferably, the acidic aqueous solution is selected from an aqueous solution of hydrochloric acid or of nitric acid. The pH of the solution obtained in step a) is preferably less than 4.

Step b) (Addition of at Least One Silicone and/or Aluminum Precursor)

During step b) of the process according to the invention, at least one silicon and/or aluminum precursor is added to the solution obtained in step a).

One or more aluminum and/or silicon precursors of alkoxide type are preferably selected. Very preferably, one or more aluminum and/or silicon precursors are selected from aluminum isopropoxide, aluminum tert-butoxide, tetraethyl orthosilicate or tetramethyl orthosilicate.

Preferably, the "precursors/surfactant" weight ratio is between 0.1 and 10, preferably between 0.2 and 5.

Step c) (Formation of an Emulsion)

During step c) of the process according to the invention, at least one liquid organic compound that is immiscible with the solution obtained in step b) is added to the solution obtained in step b) so as to form an emulsion. This step is preferably carried out at ambient temperature.

Preferably, the liquid organic compound is a hydrocarbon, or a mixture of hydrocarbons, having 5 to 15 carbon atoms; by way of example, mention may be made of dodecane. Preferably, the "liquid organic compound/solution obtained in step b)" weight ratio is between 0.2 and 5, preferably between 0.3 and 3.

Step d) (Formation of a Gel)

During step d) of the process according to the invention, the emulsion obtained in step c) is left to mature in the wet state so as to obtain a gel.

Preferably, the maturation is carried out at a temperature of between 5 and 80° C., preferably between 20 and 70° C. Preferably, the maturation is carried out for 1 to 30 days, preferably for 1 to 15 days.

Step e) (Washing)

During step d) of the process according to the invention, the gel obtained in step d) is washed with an organic solution. This step is preferably carried out at ambient temperature.

Preferably, the organic solution is acetone, ethanol, methanol, isopropanol, tetrahydrofuran, ethyl acetate or methyl acetate, alone or as a mixture. Preferably, the washing step is repeated at least twice.

Step f) (Drying and Calcining)

During step f) of the process according to the invention, the gel obtained in step e) is dried and calcined under air so as to obtain a porous monolith.

Preferably, the drying is carried out at a temperature of between 5 and 80° C., preferably between 20 and 75° C. Preferably, the drying is carried out for 1 to 30 days, preferably for 1 to 15 days.

The drying is generally carried out under air, preferably comprising between 0 and 80 grams of water per kilogram of air, an oxygen content of between 5% and 25% by volume and a carbon dioxide content of between 0% and 10% by volume; for example, the air is air from combustion of a hydrocarbon, preferably methane, or under heated air.

Preferably, the calcining is carried out under air at a temperature of between 300 and 1000° C., preferably between 350 and 900° C. Preferably, the calcining is carried out for 1 to 72 hours, preferably between 2 and 48 hours.

Even more preferably, the calcining is carried out in two steps: a first temperature stationary phase of between 120 and 250° C. for 1 to 10 hours, then a second temperature stationary phase of between 300 and 950° C. for 2 to 24 hours.

Generally, the calcining step is carried out under combustion air, preferably air from combustion of methane comprising between 40 and 80 grams of water per kg of combustion air, an oxygen content of between 5% and 15% by volume and a $CO_2$ content of between 4% and 10% by volume.

Step g) (Impregnation of the Ti Precursor)

During step g) of the process according to the invention, a solution comprising at least one soluble titanium precursor is impregnated in the porosity of the porous monolith obtained in step f).

Preferably, the titanium precursor is selected from a titanium alkoxide; very preferably, the titanium precursor is selected from titanium isopropoxide or tetraethyl orthotitanate, alone or as a mixture.

Optionally, use may be made, alone or in addition to the titanium alkoxide precursor, of at least one other inorganic titanium precursor of ionic type or in the form of a colloidal sol.

Step h) (Optional Maturation Step)

During step h) of the process according to the invention, the porous monolith obtained in step g) is left to mature in the wet state.

Preferably, a maturation step is then carried out at a temperature of between 5 and 80° C., preferably 20 to 75° C., and for 0.5 to 30 days, preferably for 1 to 15 days.

Step i) (Drying and Calcining)

During step h) of the process according to the invention, the porous monolith obtained in step g) or h) is dried and calcined under air so as to obtain a porous monolith containing $TiO_2$.

Preferably, the drying is carried out at a temperature of between 5 and 80° C., preferably between 20 and 75° C. Preferably, the drying is carried out for 1 to 30 days, preferably for 1 to 15 days.

The drying is generally carried out under air from combustion of a hydrocarbon, preferably methane, or under heated air comprising between 0 and 80 grams of water per kilogram of combustion air, an oxygen content of between 5% and 25% by volume and a carbon dioxide content of between 0% and 10% by volume.

Preferably, the calcining is carried out under air at a temperature of between 300 and 1000° C. Preferably, the calcining is carried out for 1 to 72 hours, preferably for 2 to 48 hours.

Preferably, a step of calcining under air is carried out with a first temperature stationary phase of between 80 and 150° C. for 1 to 10 hours, then a second temperature stationary phase of greater than 150° C. and less than or equal to 250° C. for 1 to 10 hours, and finally a third temperature stationary phase of between 300 and 700° C. for 0.5 to 24 hours.

Generally, the calcining step is carried out under combustion air, preferably air from combustion of methane comprising between 40 and 80 grams of water per kg of combustion air, an oxygen content of between 5% and 15% by volume and a $CO_2$ content of between 4% and 10% by volume.

According to one variant, the $TiO_2$ may be doped with one or more elements selected from metal ions, such as for example elements V, Ni, Cr, Mo, Fe, Sn, Mn, Co, Re, Nb, Sb, La, Ce, Ta or Ti, non-metal elements, such as for example C, N, S, F or P, or a mixture of metal and non-metal elements, at any step of said process and by any method known to those skilled in the art.

According to one variant, a precursor of an element M selected from an element of groups IA, IIA, VIIIB, IB and IIIA of the periodic table of the elements in the metal or oxidized state is added in steps a), b) and/or g), optionally after step i). The precursor may be in the form dissolved in solution, in the form of a solid powder or in the form of a colloidal sol.

When it is sought to obtain the element M totally or partially in its metal form, it will be possible to carry out, following step i), a step of reduction under a hydrogen stream at a temperature of between 100 and 600° C., for 0.5 to 24 h.

Without presenting a limiting nature, the porous monolith containing $TiO_2$ according to the invention may advantageously be used in photocatalysis for the production of dihydrogen by dissociation of water.

The following examples illustrate the invention without limiting the scope thereof.

EXAMPLES

Example 1: Solid A (Not in Accordance with the Invention) TiO$_2$ Monolith 1 g of polyethylene glycol (Aldrich™, M$_w$=20 000) is added to 2 ml of distilled water, then mixed with 1 ml of a hydrochloric acid solution (37% by weight, Aldrich™, purity 97%). 1.1 g of titanium isopropoxide (Aldrich™, purity 97%) is added to the mixture at ambient temperature and the resulting mixture is stirred until an apparently single-phase mixture is obtained.

The mixture is then poured into a Petri dish with a 5.5 cm internal diameter, which is placed in a saturator (the water vapor content is adjusted by the saturator, according to the vapor pressure laws) for 7 days for gelling at ambient temperature.

The gel obtained is then washed with isopropanol (Aldrich™, purity >99.5%) two times successively, then dried at ambient temperature for 2 days. Finally, the gel is calcined under air in a muffle furnace at 180° C. for 2 h, then at 350° C. for 6 h.

The solid A is then obtained in the form of a TiO$_2$-based porous monolith.

The solid A has a mesoporous volume of 0.16 ml/g, a type-I macroporous volume of 0.19 ml/g and a type-II macroporous volume of 2.3 ml/g. The solid A has a specific surface area of 94 m$^2$/g.

The porous monolith A has a bulk density of 0.23 g/ml.

Example 2: Solid B (Not in Accordance with the Invention) TiO$_2$ Monolith 1.12 g of myristyltrimethylammonium bromide (Aldrich™, purity >99%) are added to 2 ml of distilled water, then mixed with 1 ml of a hydrochloric acid solution (37% by weight, Aldrich™, purity 97%). 2.2 g of titanium isopropoxide (Aldrich™, purity 97%) are added to the mixture at ambient temperature and the resulting mixture is stirred until an apparently single-phase mixture is obtained.

7 g of heptane (Aldrich™, purity >99%) are slowly introduced into the mixture with stirring until an emulsion has formed.

0.4 ml of an aqueous ammonia solution (Aldrich™, ACS reagent, 28.0-30.0% NH$_3$ basis) is then added to the emulsion.

The emulsion is then poured into a Petri dish with a 5.5 cm internal diameter, which is placed in a saturator for 7 days for gelling at ambient temperature.

The gel obtained is then washed a first time with anhydrous tetrahydrofuran (Aldrich™, purity >99%), then washed two times successively with an anhydrous tetrahydrofuran/acetone mixture (VWR™, ACS grade) at 70/70 by volume.

The gel is then dried at ambient temperature for 7 days. Finally, the gel is calcined under air in a muffle furnace at 200° C. for 2 h, then at 450° C. for 6 h.

The solid B is then obtained in the form of a TiO$_2$-based porous monolith.

The solid B has a mesoporous volume of 0.29 ml/g, a type-I macroporous volume of 0.30 ml/g and a type-II macroporous volume of less than 0.4 ml/g. The solid B has a specific surface area of 135 m$^2$/g.

The porous monolith B has a bulk density of 1.1 g/ml.

Example 3: Solid C (in Accordance with the Invention) TiO$_2$/SiO$_2$ Monolith 1.12 g of myristyltrimethylammonium bromide (Aldrich™, purity >99%) are added to 2 ml of distilled water, then mixed with 1 ml of a hydrochloric acid solution (37% by weight, Aldrich™, purity 97%). 1.02 g of tetraethyl orthosilicate (Aldrich™, purity >99%) are added to the mixture at ambient temperature and the resulting mixture is stirred until an apparently single-phase mixture is obtained.

7 g of dodecane (Aldrich™, purity >99%) are slowly introduced into the mixture with stirring until an emulsion has formed.

The emulsion is then poured into a Petri dish with a 5.5 cm internal diameter, which is placed in a saturator for 7 days for gelling at ambient temperature.

The gel obtained is then washed a first time with anhydrous tetrahydrofuran (Aldrich™, purity >99%), then washed two times successively with an anhydrous tetrahydrofuran/acetone mixture (VWR™, ACS grade) at 70/30 by volume.

The gel is then dried at ambient temperature for 7 days. Finally, the gel is calcined under air in a muffle furnace at 180° C. for 2 h, then at 650° C. for 5 h. An SiO$_2$-based porous monolith, of which the total pore volume is 10.5 ml/g, is then obtained.

A solution containing 34 ml of distilled water, 44.75 ml of isopropanol (Aldrich™, purity >99.5%), 10.74 ml of hydrochloric acid (37% by weight, Aldrich™, purity 97%) and 10.50 ml of titanium isopropoxide (Aldrich™, purity 97%) is prepared with stirring. A portion of this solution corresponding to the total pore volume is impregnated in the porosity of the monolith, then left to mature for 12 h at ambient temperature. The monolith is then dried under an ambient atmosphere for 24 h. The step is repeated a second time. Finally, the monolith is calcined under air in a muffle furnace at 120° C. for 2 h, then at 180° C. for 2 h and, finally, at 400° C. for 1 h. A porous monolith comprising TiO$_2$ in an SiO$_2$ matrix is then obtained.

The solid C has a mesoporous volume of 0.20 ml/g, a type-I macroporous volume of 1.15 ml/g and a type-II macroporous volume of 5.8 ml/g. The solid C has a specific surface area of 212 m$^2$/g. The content of Ti element measured by ICP-AES is 27.35% by weight, which is equivalent to 52.1% by weight of the TiO$_2$ semiconductor in the solid C.

The porous monolith C has a bulk density of 0.14 g/ml.

Example 4: Use of the Solids for the Photocatalytic Production of Dihydrogen by Dissociation of Water in the Gas Phase The porous monoliths A, B and C are subjected to a test of photocatalytic production of dihydrogen by dissociation of water in the gas phase in a flow-through bed continuous steel reactor fitted with an optical window made of quartz and with a frit opposite the optical window, on which the solid is deposited.

The monoliths are placed on the frit, their diameter being equal to the diameter of the reactor. The surface area irradiated for all the photocatalysts is 8.042477×10$^{-04}$ m$^2$. The tests are carried out at ambient temperature under atmospheric pressure. An argon flow rate of 3 ml/min passes through a water saturator before being dispensed into the reactor. The production of produced dihydrogen gas resulting from the photocatalytic reduction of the water entrained in the saturator is monitored by means of an analysis of the effluent every 4 minutes by micro gas chromatography. The UV-visible irradiation source is provided by a Xe—Hg lamp (Asahi™, MAX302™). The irradiation power is always maintained at 80 W/m$^2$ for a wavelength range of between 315 and 400 nm. The duration of the test is 20 hours.

The photocatalytic activities are expressed in μmol of dihydrogen produced per hour and per gram of $TiO_2$. They are mean activities over the entire duration of the tests. The results are given in table 1 below.

TABLE 1

Performance levels of the photocatalysts in terms of mean activity for the production of dihydrogen from a mixture of argon and $H_2O$ in the gas phase

| Photocatalyst | | Mean activity $H_2$ (μmol/h/$g_{TiO2}$) |
|---|---|---|
| Solid A (not in accordance) | $TiO_2$ monolith | 0.18 |
| Solid B (not in accordance) | $TiO_2$ monolith | 0.27 |
| Solid C (in accordance) | $TiO_2/SiO_2$ monolith | 1.34 |

The activity values show that the solid according to the invention exhibits better performance levels when it is used in photocatalytic production of dihydrogen by dissociation of water.

The invention claimed is:

1. A porous monolith comprising between 20% and 70% by weight of $TiO_2$ relative to the total weight of the monolith, between 30% and 80% by weight of a refractory oxide, which is silica, alumina or silica-alumina relative to the total weight of the monolith, and wherein said porous monolith has a bulk density of less than 0.19 g/ml.

2. The monolith as claimed in claim 1, having a bulk density of less than 0.16 g/ml.

3. The monolith as claimed in claim 1, which comprises a mesoporous volume of from 0.1 to 1 ml/g for a pore diameter between 0.2 and 50 nm.

4. The monolith as claimed in claim 1, which comprises a type-I macroporous volume, of which the pore diameter is greater than 50 nm and less than or equal to 1000 nm, of between 0.1 and 3 ml/g.

5. The monolith as claimed in claim 1, which comprises a type-II macroporous volume, of which the pore diameter is greater than 1 μm and less than or equal to 10 μm, of between 0.1 and 8 ml/g.

6. The monolith as claimed in claim 1, which comprises a mesoporosity and/or a type-I macroporosity and/or a type-II macroporosity.

7. The monolith as claimed in claim 1, which also comprises a macroporous volume of less than 0.5 ml/g for a pore diameter of greater than 10 μm.

8. The monolith as claimed in claim 1, which comprises a BET specific surface area of between 150 and 700 $m^2/g$.

9. The monolith as claimed in claim 1, which also comprises at least one element M selected from the group consisting of groups IA, IIA, VIIIB, IB and IIIA elements of the periodic table of elements alone or as a mixture.

10. The monolith as claimed in claim 9, in which the content of element(s) M is between 0.001% and 20% by weight relative to the total weight of the porous monolith.

11. The monolith as claimed in claim 1, which also comprises one or more doping elements selected from metal elements, non-metal elements, or a mixture of metal and non-metal elements.

12. The monolith as claimed in claim 11, in which the content of the doping element is between 0.001% and 5% by weight relative to the total weight of the porous monolith.

13. A process for preparing a porous monolith as claimed in claim 1, comprising the following steps:
   a) mixing a solution containing a surfactant with an acidic aqueous solution to obtain an acidic aqueous solution comprising a surfactant;
   b) adding at least one silicon and/or aluminum precursor to the solution obtained in step a);
   c) adding at least one liquid organic compound that is immiscible with the solution obtained in step b) to the solution obtained in step b) to form an emulsion;
   d) leaving to mature the emulsion obtained in step c) in a wet state to obtain a gel;
   e) washing the gel obtained in step d) with an organic solution;
   drying the gel obtained in step e) and calcining to obtain a porous monolith;
   g) impregnating a solution comprising at least one soluble titanium precursor in the porosity of the porous monolith obtained in step t);
   h) optionally, leaving to mature the porous monolith obtained in step g) in a wet state;
   i) drying and calcining the porous monolith obtained in step g) or h) to obtain a porous monolith containing $TiO_2$.

14. The process as claimed in claim 13, wherein, in step i), drying is carried out at a temperature of between 5 and 80° C. and calcining is carried out at a temperature of between 300 and 1000° C.

15. The process as claimed in claim 13, wherein, in step i), calcining is carried out in two consecutive steps: a first temperature stationary phase of between 120 and 250° C. for 1 to 10 hours, then a second temperature stationary phase of between 300 and 950° C. for 2 to 24 hours.

16. The monolith as claimed in claim 1, which also comprises one or more doping elements selected from metal elements selected from the group consisting of V, Ni, Cr, Mo, Fe, Sn, Mn, Co, Re, Nb, Sb, La, Ce, Ta and Ti, or non-metal elements selected from the group consisting of C, N, S, F or P, or a mixture of said metal and non-metal elements.

* * * * *